United States Patent [19]
White

[11] 3,836,929
[45] Sept. 17, 1974

[54] LOW ANGLE RADIO DIRECTION FINDING

[75] Inventor: Warren D. White, Northport, N.Y.

[73] Assignee: Cutler-Hammer, Inc., Milwaukee, Wis.

[22] Filed: Mar. 15, 1973

[21] Appl. No.: 341,547

[52] U.S. Cl............ 343/113 R, 325/371, 343/100 R
[51] Int. Cl.............................................. G01s 3/06
[58] Field of Search........... 343/114, 100 SA, 114.5, 343/100 LE, 113 R, 100 R; 325/371

[56] References Cited
UNITED STATES PATENTS

| | | |
|---|---|---|
| 3,036,301 | 5/1962 | Wiesner............................ 325/371 |
| 3,229,283 | 1/1966 | Hefter et al...................... 343/16 M |
| 3,503,069 | 3/1970 | Lloyd............................... 343/100 R |
| 3,757,326 | 9/1973 | White............................... 343/16 M |

Primary Examiner—T. H. Tubbesing
Assistant Examiner—Richard E. Berger
Attorney, Agent, or Firm—Henry Huff

[57] ABSTRACT

A radio direction finder system with a beam-forming antenna capable of accurate operation with its boresight axis nearly parallel to a reflecting surface, by automatically directing a pattern null toward the image of a radiating target whereby signals received indirectly from the target by reflection from the surface are rejected.

5 Claims, 7 Drawing Figures

E, IN SBW FROM BORESIGHT

LOW ANGLE RADIO DIRECTION FINDING

BACKGROUND

1 Field

This invention pertains to improvements in direction finding receiver apparatus of the simultaneous lobing type, commonly used in combination with other equipment in known manner for tracking targets that transmit or reflect radio waves, as in monopulse radar systems.

2 Prior Art

Monopulse radars are described in *Introduction to Radar Systems*, by Merrill I. Skolnik, published by McGraw Hill Book Compay, Inc. in 1962, beginning at page 175. FIG. 5.10 on page 178 illustrates a usual type of such radar, arranged for tracking in range, elevation and azimuth. The parts of the system associated with determining the elevation angle of an arriving radio signal constitute a form of simultaneous lobing direction finder.

When the directive antenna is aimed at so low an elevation angle that the lower part of the beam pattern intercepts the reflecting surface of the neighboring terrain or water, an undesired signal of substantial strength can be received from the target by way of reflection from the surface. This indirectly received signal combines with the desired directly received signal in such manner as to cause erratic and inaccurate operation of the direction finder. Typical monopulse radars are essentially unusable at elevation angles of about one beam width or less.

Various approaches to the low angle tracking problem have involved the use of frequency diversity, discrimination between direct and refleceted signals on the basis of doppler shift, shaping the beam to minimize the ratio between responses to reflected and direct signals, and estimates of true elevation based on phase variations in the combined received signal. Those that have been implemented have been only moderately successful and have been generally complex and expensive.

Another approach, which could solve the problem satisfactorily but would be elaborate and costly in practice, would be the use of two independently steerable beam sets, one to be pointed at the target and the other to be pointed at the image of the target. Both beams sets receive both the direct and reflected signals, but in different proportions, which can be computed for the correct pointing angles. The two received composite signals can be combined in a suitable matrix to produce two error signals, each independently representing the pointing error of the respective beam set. The error signals steer the beam sets as required, and the elevation angle of the upper beam set then equals that of the target.

SUMMARY

According to this invention, a single set of beams, steered in fixed relationship to each other rather than independently, provides a pattern with a difference signal null directed along the principal directive axis, commonly called the boresight, of the antenna system and also a second difference signal null which is automatically directed along the image of the boresight, i.e., pointed in the direction of arrival of the undesired reflected target signal when the boresight is pointed at the target.

The respective combined direct and indirect signals received in the individual beams are themselves combined in a relatively simple arrangement to produce an elevation error signal that can be used to steer the beam set to point the boresight at the target and the second null at its image.

A practical embodiment of the invention can be, and has been, constructed by modifying an existing monopulse radar to provide, in addition to the usual sum and difference beams, a compensating beam which is used to modify the difference beam to produce the required second null. This arrangement smoothly and consistently tracks targets at elevation angles of substantially less than one beam width.

DRAWING

DESCRIPTION

Figure 1:
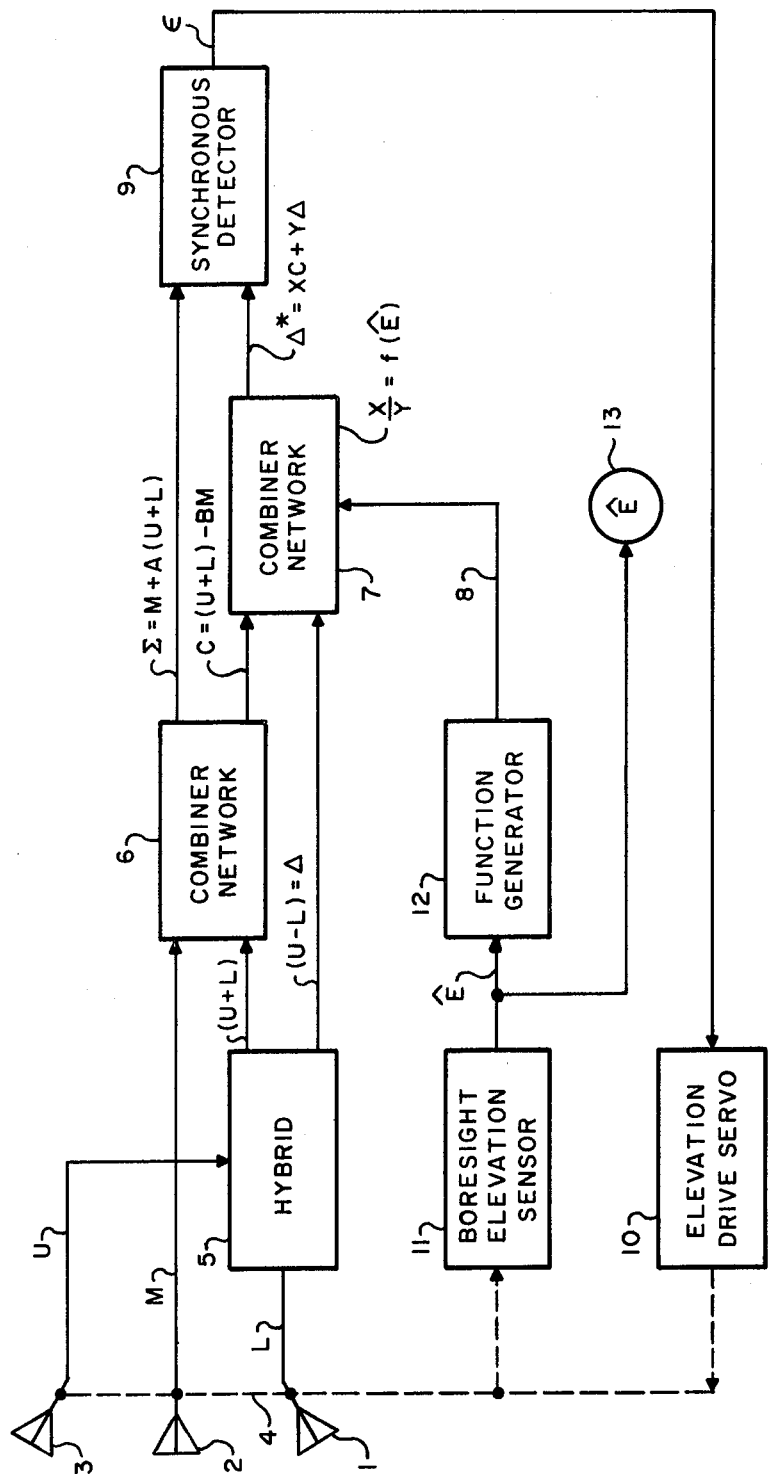
FIG. 1 is a block diagram of a preferred embodiment of the invention using a set of three beams.

Referring to FIG. 1, three beam-forming antenna elements 1, 2 and 3 are mechanically coupled together in fixed positional relationship to each other, as indicated by dash line 4. The elements 1, 2 and 3 may be feed horns associated in conventional manner with a parabolic reflector, not shown, to provide respectively lower, middle and upper overlapping beams. The entire antenna assembly is movable in elevation as a unit, like that of a monopulse tracking radar.

Figure 2A:
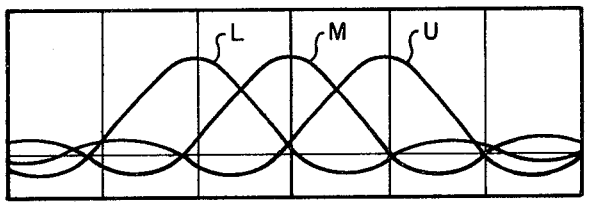
FIG. 2a is a group of graphs showing the elemental directive patterns of the lower, middle and upper antenna feeds of the system of FIG. 1.

FIG. 2a shows, in rectangular coordinates, the directive patterns L, M and U respectively provided by the elements 1, 2 and 3, in terms of relative amplitude v. elevation angle E referred to the main axis, or boresight of the antenna assembly. The elevation angle is expressed in normalized units of standard beam width, BW, defined as $\lambda/D$ radians, where $\lambda$ is the operating wavelength and D is the effective diameter of the antenna aperture.

The middle beam, as represented by the curve M, is directed along the boresight. The antenna elements are so oriented that the lower beam L is pointed about one beam width below the boresight and the upper beam U is pointed about one beam width above the boresight, as shown. The negative amplitude parts of the curves below the abscissa conventionally represent those parts of the beam patterns where the r-f phase is opposite to that of the parts shown above the abscissa.

Returning to FIG. 1, the lower and upper antenna elements 1 and 3 are connected to respective input ports of a hybrid junction device 5, which combines the inputs from the two antenna elements as in the ordinary monopulse radar to produce sum and difference outputs. The hybrid 5 may be, for example, a 3dB directional coupler.

The middle antenna element 2 and the sum output port of hybrid 5 are connected to respective input ports of a combiner network 6. The network 6, like the hybrid 5, has sum and difference output ports but is designed in known manner so that the contributions of the two inputs to the sum and difference outputs are proportioned as will be described.

Denoting the relative amplitudes of the r-f signals produced by antennas 1, 2 and 3 in response to an arriving wave as L, M and U respectively, the amplitude of the sum output of hybrid 5 is proportional to ($U+L$) and that of the difference output is similarly proportional to ($U-L$). The latter is designated $\Delta$, and varies as a function of the elevation angle of wave arrival referred to the boresight, as illustrated by curve $\Delta$ in FIG. 2b. This curve is the basic unmodified elevation difference pattern of the system, resembling the difference pattern of a monopulse radar and synthesized in the same way from the lower and upper elemental beam patterns.

Figure 2B:
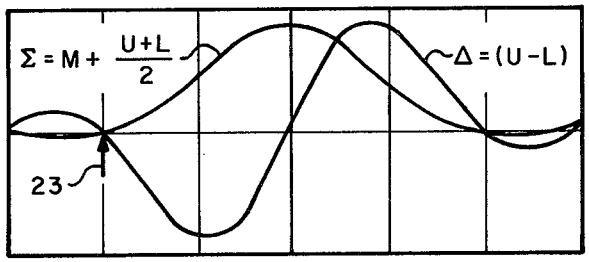
FIG. 2b shows the sum and uncompensated difference patterns, similar to the usual monopulse sum and difference patterns, produced by certain combinations of the above elemental patterns.
Figure 2C:
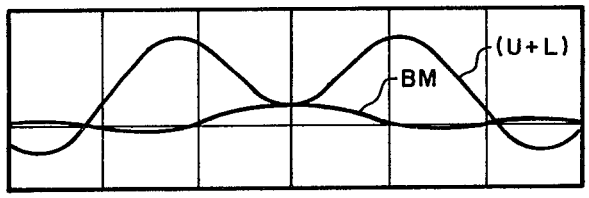
FIG. 2c illustrates the synthesis of the compensating beam pattern from the elemental patterns.

The sum output of hybrid 5 varies as a function of elevational angle of wave arrival and is shown by curve ($U+L$) in FIG. 2c. This pattern exhibits even order symmetry, with a minimum, not zero, at the boresight, and positive (i.e., cophasal) maxima at about plus one and minus one BW, corresponding to the positive maxima of U and L of FIG. 2a.

The sum output $\Sigma$ of the combiner network 6 is the sum of the middle antenna signal $M$, and a constant $A$ times the sum output ($U+L$) of the hybrid 5:

$$\Sigma = M + A (U + L)$$

The constant A may be, for example, 0.5. The resulting pattern, shown in FIG. 2b by the curve $\Sigma$, resembles the usual sum pattern of a monopulse radar.

The difference output C of the network 6 is the difference between the sum output ($U+L$) of the hybrid 5, and a constant B times the middle antenna signal M:

$$C = (U + L) - BM$$

Figure 2D:
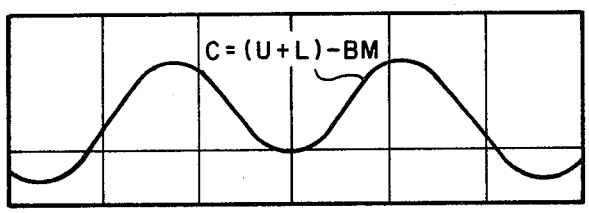
FIG. 2d shows the resulting compensating beam patterns produced by additively combining the uncompensated difference pattern with the compensating pattern in different proportions.

The constant $B$ is determined from the relationship between patterns $L$, $M$ and $U$ of FIG. 2a, to make BM at boresight equal to the boresight minimum of ($U+L$) as illustrated in FIG. 2c. Thus the pattern C, as shown in FIG. 2d, goes to a zero amplitude null at the boresight. This pattern represents the aforementioned compensating beam.

For simplicity of illustration, the usual frequency converter, i-f amplifier, amplitude detector and video amplifier means are omitted from FIG. 1. It is assumed that these components are provided where required in conventional manner, for example as shown in FIG. 5.10 of the Skolnik reference. The symbols $\Sigma$, $\Delta$ and C are used herein to represent the relative amplitudes of the respective signals, whether r-f, i-f or video.

The difference outputs $\Delta$ and C of the hybrid 5 and combiner network 6 are applied to respective input ports of a second combiner network 7 which has a sum output port and is designed so that the relative contributions of the two inputs to the sum output can be adjusted by means of a control input supplied on line 8.

The output of network 7 is the modified or compensated difference:

$$\Delta^* = XC + Y,$$

where either or both multipliers X and y, or their ratio X/Y, may be adjusted by the control input.

The network 7 may, for example, consist of an ordinary goniometer or resolver device with two orthogonally related stator windings connected to receive the respective inputs C and $\Delta$ and a rotor winding serving as the output means. In this case the control input is by way of rotation of the rotor shaft, and the amplitude of the output is proportional to $$C \sin \theta + \Delta \cos\theta,$$

where $\theta$ is the angular position of the shaft with respect to a reference position. The ratio X/Y is tan $\theta$, and can be adjusted to any required value by setting the rotor shaft to the appropriate angle.

The amplitude $\Delta^*$ is a function of elevation angle E, as are its components $\Delta$ and C, and is also a function of the ratio x/y in which said components are combined. When the patterns C (FIG. 2d) and $\Delta$ (FIG. 2b) are additively combined in some finite proportion X/Y, the resulting pattern will still exhibit a principal null at boresight because both components are null there. Below boresight, however, the two components are antiphasal and will oppose each other to produce a secondary null at some angle that depends on the shapes and relative orientation of the upper and lower beams, which are constants, and on X/Y, which variable.

Figure 2E:
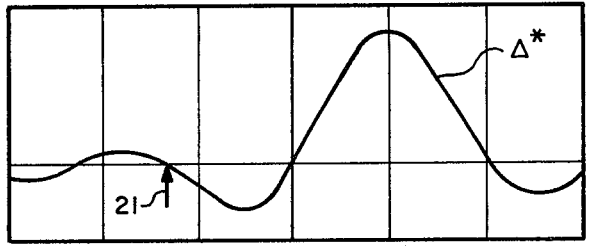
FIGS. 2e and 2f show the modified difference patterns obtained by adding the compensating pattern to the basic difference pattern in varying proportions.
Figure 2F:
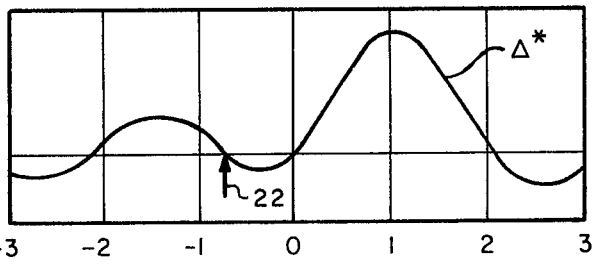

FIGS. 2e and 2f show the modified difference patterns $\Delta^*$ produced by adding successively greater amounts of the compensating pattern C to successively smaller amounts of the basic difference pattern $\Delta$, i.e., increasing the ratio X/Y. The secondary null appears at about minus 1½ BW in FIG. 2e, as indicated by the arrow 21. In the pattern of FIG. 2f, the secondary null has moved to about minus ¾ BW, as indicated by the arrow 22. In FIG. 2b it is seen that the unmodified difference pattern ($X/Y=0$) exhibits a secondary null at about minus 2 BW, as indicated by the arrow 23. The effect of increasing X/Y is to move the null toward the boresight. Finally, as X/Y approaches infinity, the difference pattern approaches identity to the compensating pattern C, and the secondary null merges with the primary null to form a single null at the boresight.

Returning to FIG. 1, the sum outputs $\Sigma$ and $\Delta^*$ of networks 6 and 7 are applied to a synchronous detector 9, which is the same as the synchronous detectors, otherwise known as phase sensitive detectors, ordinarily used in monopulse radars. The output of detector 9 is a d-C voltage of a magnitude proportional to the product of the amplitudes of the two inputs, and a polarity that depends on whether the inputs are cophasal or antiphasal. This voltage is the elevation error signal $\epsilon$, and, as in the usual monopulse system, represents the amount and sense of the deviation of the boresight elevation from the elevational angle of arrival of a received radio wave.

The error signal $\epsilon$ is the control input to an elevation drive servomechanism 10 for positioning the antenna assembly 1, 2, 3. The servo 10 may be the same as the usual elevation drive servo of a conventional tracking radar. A boresight elevation sensor 11 provides an output signal $\hat{E}$ that represents the elevation angle of the antenna boresight with respect to the horizontal. The sensor 11 may be a part of the servo 10, or may be simply a shaft coupled to the antenna assembly. An indicator 13 may be provided to display the elevation angle.

The boresight elevation signal $\hat{E}$ is applied to a function generator 12 which modifies or converts it to a form suitable for use as the ratio control input to the combiner network 7, on line 8. If the boresight elevation signal is expressed as a shaft position, and the combiner network is a goniometer or resolver device controlled by an input shaft, the function generator 12 may be a known mechanism including a cam.

One suitable mechanism is a cam compensator of the type described in *Wireless Direction Finding*, by R. Keen, 4th Edition, published by Iliffe and Sons, Ltd. in 1947, on pages 501, 518 and 524. In this case the cam is cut to control the combiner network 7 in such manner that the above described secondary null of the compensated difference pattern will be pointed below the horizon at the image of the target that the primary (boresight) null is pointed at, above the horizon.

The specific shape of the function to be generated, and hence that of the cam, can be determined analytically from the component antenna patterns and the characteristic of the combiner network 7, or experimentally, or by a combination of both techniques. In any event, the function is required to be generated only for a relatively small range of boresight elevation, up to about two beam widths above the horizontal. Beyond this range, the antenna assembly points up enough to prevent reception of waves reflected from the surrounding surface.

It is to be understood that the above described combiner network and function generator devices are given only as practical illustrations, and that other well known electrical or electromechanical devices could be used instead. The boresight elevation sensor 11 could be a potentiometer, for example, and the combiner network 7 could include an electrically controllable attenuator for the C signal. The function generator 12 could be part of the sensor 11 or of the network 7, rather than a physically separate entity.

When the antenna boresight is pointed directly at a target at an elevation $\hat{E}$ of less than about two beam widths, the modified difference input $\Delta^*$ to the synchronous detector 9 will be zero, because the principal or boresight null will be on the target and the secondary null will be on its image, and the error signal $\epsilon$ will be zero. The indicator 13 then shows the target elevation angle.

When the boresight is not pointed exactly at the target but, for example, somewhat above it, the modified difference input $\Delta^*$ comprises one component that results from the fact that the boresight is above the target, and another component that results from the fact that the secondary null is below the image of the target. Since the slope of the modified difference pattern, see FIG. 2*f*, for example, is positive in the region of the secondary null, these components are additive, and the resulting error signal $\epsilon$ is of such sense as to control the servo 10 to drive the boresight toward the target and the secondary null toward the image.

At elevations of more than about two beamwidths, the target image is outside the main beam pattern so there is no need to direct a secondary null at the image. The function generator 12 may be designed to adjust the combiner network to make $X/Y$ approach zero with increasing boresight elevations. The difference input $\Delta^*$ to the synchronous detector 9 then approaches identity to the unmodified difference $\Delta$, thus effecting a transition in operation of the system to that of a conventional monopulse receiver, using the sum and difference patterns shown in FIG. 2*b*.

A relatively very small signal may be received from the target image by way of the sidelobes of the main beam pattern. Such sidelobes exist in any realizable directive pattern, and can be a source of residual error in boresight pointing. This error may be further reduced, if desired, by designing the function generator 12 to null or approximately null some or all of the larger sidelobes as they in turn point toward the target image.

I claim:

1. A method of direction finding on radio waves arriving at low angles with respect to a reflecting surface, comprising the steps of
    a. producing a difference pattern having a principal null axis and a secondary null axis,
    b. maintaining said axes at opposite angles with respect to said surface, and
    c. adjusting said angles coordinately to point said principal null axis toward the direction of arrival of said waves in the direct path which does not include reflection from said surface, and point said secondary null in the direction of arrival of said waves by reflection from said surface.

2. A method of radio direction finding at low elevation angles with respect to an adjacent generally horizontal land or water surface, comprising the steps of
    a. receiving arriving radio waves in a set of directive beams that are in fixed angular overlapping elevational relationship to each other, to produce respective received signals,
    b. combining at least two of said signals to produce a difference signal representative of response in a directive pattern having odd order symmetry about a boresight null,
    c. combining at least two of said signals to produce a compensating signal representative of response in a directive pattern having even order symmetry about a boresight null,
    d. combining said difference signal with said compensating signal to produce a modified difference signal representative of response in a directive pattern having a boresight null and a secondary null directed below boresight by an angle that depends upon the proportion in which said difference and compensating signals are combined,
    e. adjusting said proportion in accordance with the boresight elevation angle to direct said secondary null below the horizon by an angle corresponding to the angle of elevation of the boresight above the horizon,
    f. producing a sum or phase reference signal representative of response in a directive pattern having a boresight maximum,
    g. synchronously detecting said reference signal and said modified difference signal to produce an error signal,
    h. adjusting the boresight elevation to minimize said error signal, and
    i. indicating said boresight elevation.

3. Apparatus for directively receiving radio waves that arrive at low elevation angles with respect to an adjacent generally horizontal reflecting surface, comprising a. an antenna including a plurality of directive elements disposed to provide directive response patterns in the form of beams that are in fixed angular overlapping elevational relationship for producing respective signals in response to arriving radio waves, b. means for combining said signals to produce a composite difference signal corresponding to response in a directive pattern having a null at boresight and a secondary null directed below boresight by an angle that depends on a proportion in which said signals are combined, and c. means for adjusting said proportion in accordance with the boresight elevation angle to direct said secondary null below the horizon by an angle depending upon the boresight elevation angle.

4. Apparatus for directively receiving radio waves that arrive at low elevation angles with respect to an adjacent generally horizontal reflecting surface, comprising a. an antenna including a plurality of directive elements disposed to provide lower, middle and upper directive response patterns in the form of respective beams that are in fixed angular overlapping elevational relationship for producing, in response to arriving radio waves, signals designated respectively as L, M and U, b. means for subtractively combining said signals U and L to produce a difference signal corresponding to response in a directive pattern having odd order symmetry about a null at boresight, c. means for additively combining said signals U and L and combining said signal M therewith to produce a compensating signal corresponding to response in a directive pattern having even order symmetry about a null at boresight, d. means for additively combining said compensating signal with said difference signal to produce a modified difference signal corresponding to response in a directive pattern having a null at boresight and a secondary null directed below boresight by an angle that depends on the proportion in which said compensating signal and said difference signal are combined, e. means for adjusting said proportion in accordance with the boresight elevation angle to direct said secondary null below the horizon by an angle that depends upon the boresight elevation angle, f. means for producing a signal corresponding to response in a directive pattern having a boresight maximum, g. means responsive to said boresight maximum signal and said modified difference signal to produce an error signal, and h. means for adjusting the boresight elevation to minimize said error signal.

5. The method set forth in claim 1, further including the steps of d. producing a sum pattern that contains said principal null axis, e. combining the signals received on said difference pattern and said sum pattern pattern to produce an error signal representing the magnitude and sense of deviation of said principal null axis from said direction of arrival of said waves in said direct path, and f. utilizing said error signal to control the performance of said step (c) of adjusting said angles.

* * * * *